Aug. 23, 1966    J. W. BURNS ETAL    3,268,791
CENTRIFUGAL EXTRACTION MACHINE HAVING SPEED CONTROL
MEANS RESPONSIVE TO VIBRATION
Filed Dec. 26, 1963    3 Sheets-Sheet 1

INVENTORS
Jerry W. Burns
Edwin H. Halsted
BY
J. C. Evans
THEIR ATTORNEY

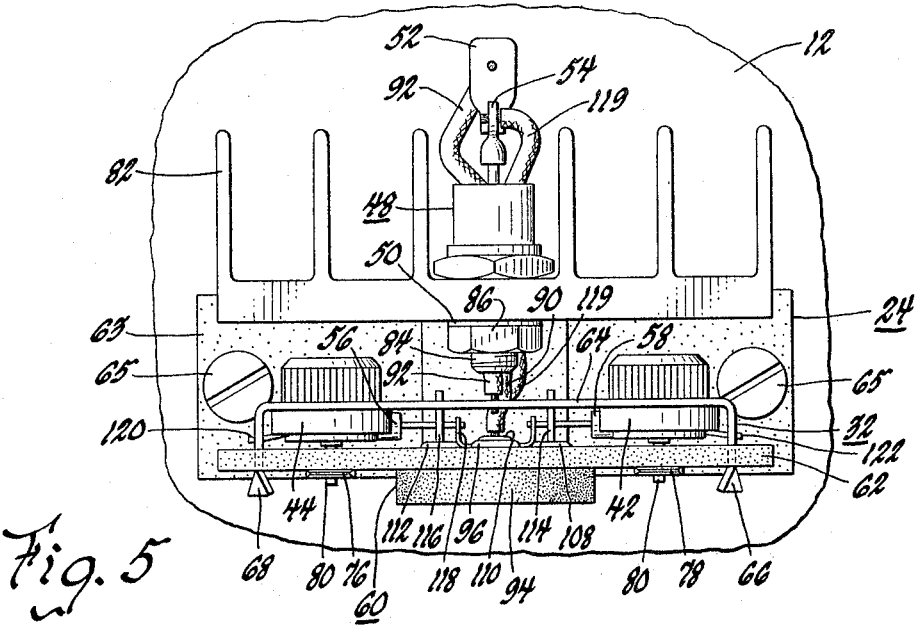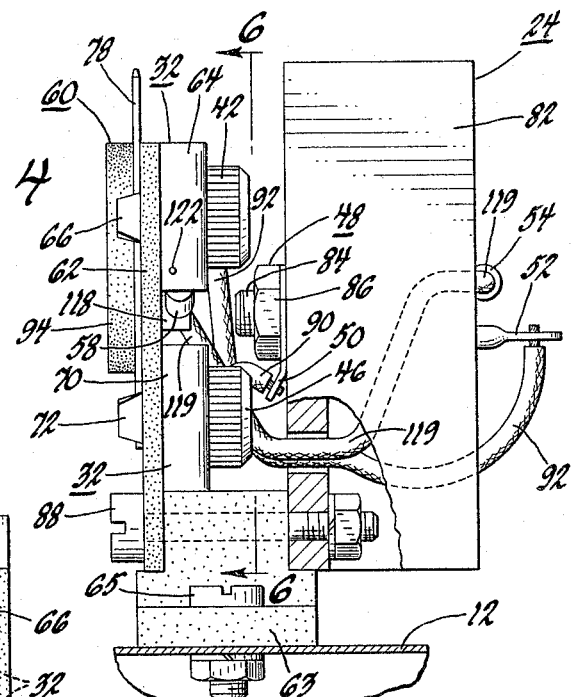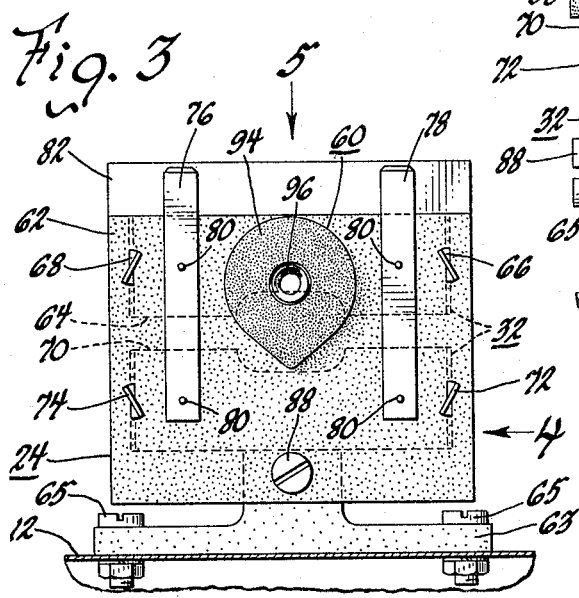

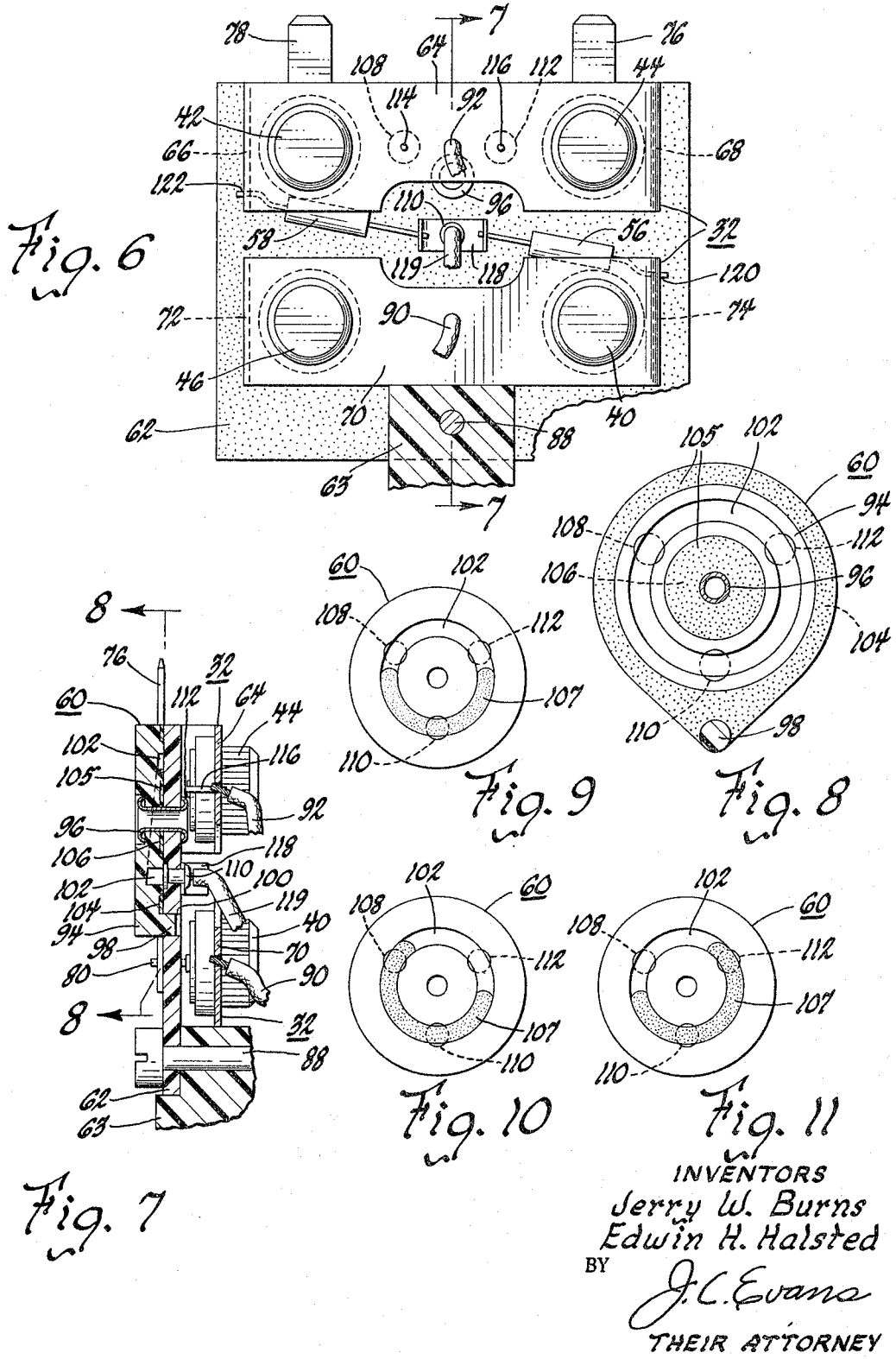

United States Patent Office 3,268,791
Patented August 23, 1966

3,268,791
CENTRIFUGAL EXTRACTION MACHINE HAVING SPEED CONTROL MEANS RESPONSIVE TO VIBRATION
Jerry W. Burns, Arcanum, and Edwin H. Halsted, Dayton, Ohio, assignors to General Motors Corporation, Detroit, Mich., a corporation of Delaware
Filed Dec. 26, 1963, Ser. No. 333,446
15 Claims. (Cl. 318—460)

This invention relates to control systems for machines and more particularly to control systems for preventing excessive vibrations in machines.

Many centrifugal machines tend to become unbalanced during their operation because of an uneven distribution of weight with respect to the axis of rotation thereof. This problem is particularly manifested in centrifugal devices including a rotatable cylindrical container in which fabrics and the like are cleaned. When such devices are operated so that the rotatable container attains high speeds necessary for extracting or centrifuging fluid from articles being cleaned an uneven distribution of articles can cause vibrations in the supporting machine framework of an amplitude sufficient to produce instability or to damage the operative parts of the machine.

Accordingly, an object of the present invention is to limit vibrations in a centrifugal type machine by the provision of control means including vibration responsive switch means operatively associated with drive means for continuously limiting the power input thereto as an inverse function of the amplitude of vibration in the machine.

A further object of the present invention is to improve the operation of centrifugal type machines by the provision of an improved vibration control system including means for selectively de-energizing an electric motor component of the machine upon movement of a sensing unit both in a first direction and a direction opposite to said first direction.

Yet another object of the present invention is to improve vibration control in a centrifugal type machine or the like during the high-speed spin cycle of operation thereof by means of a control system including improved mercury pool transducer means sensing vibrations in the machine and conditioning semiconductor means so as to continuously limit the power input to an electric motor as an inverse function of the amplitude of vibration in the machine.

Further objects and advantages of the present invention will be apparent from the following description, reference being had to the accompanying drawings wherein a preferred embodiment of the present invention is clearly shown.

In the drawings:

FIGURE 3 is a view in front elevation of a structural embodiment of the present invention;

FIGURE 4 is an enlarged view in elevation looking in the direction of arrow 4 in FIGURE 3;

FIGURE 5 is an enlarged view in elevation looking in the direction of arrow 5 in FIGURE 3;

FIGURE 6 is a view in vertical section taken along the line 6—6 of FIGURE 4;

FIGURE 7 is a view in vertical section taken along the line 7—7 of FIGURE 6;

FIGURE 8 is a view in vertical section taken along the line 8—8 of FIGURE 7;

FIGURE 9 is a schematic view of a fluid conductor switch component of the present invention in a first operative position;

FIGURE 10 is a view of the switch of FIGURE 9 in a second operative position; and FIGURE 11 is a view showing the switch in a third operative position.

Figure 1:
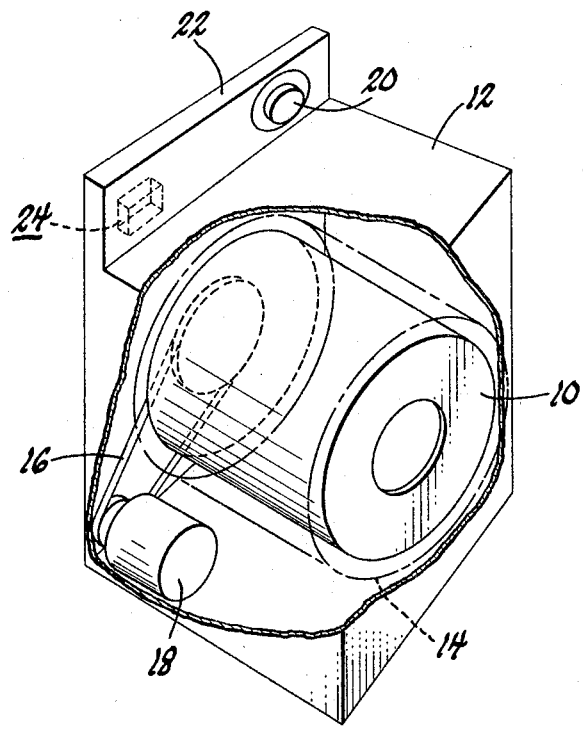
FIGURE 1 is a view in perspective of a centrifugal machine including the control means of the present invention.

Referring to the drawings, FIGURE 1 shows a centrifugal machine representatively illustrated as an automatic washing machine of the type including a horizontal tumbling drum 10 that is rotatably supported by suitable means well known to those skilled in the art within an enclosing outer shell or cabinet 12 and water container 14 (shown in phantom). In the illustrated arrangement, the drum 10 is driven in a predetermined fashion by a belt pulley system 16 operatively associated with a suitable drive unit, for example, a multiple speed motor transmission assembly 18. Fill, drain and other typical cleaning device systems are omitted in the illustrated machine with it being understood that the machine may be of the type having suitable fill, low-spin speed wash, rinse and high-spin speed dry, or the like, cycles of operation as established by a suitable timer control dial 20 shown in FIGURE 1 on an upper rear control panel 22 of the machine.

Figure 2:
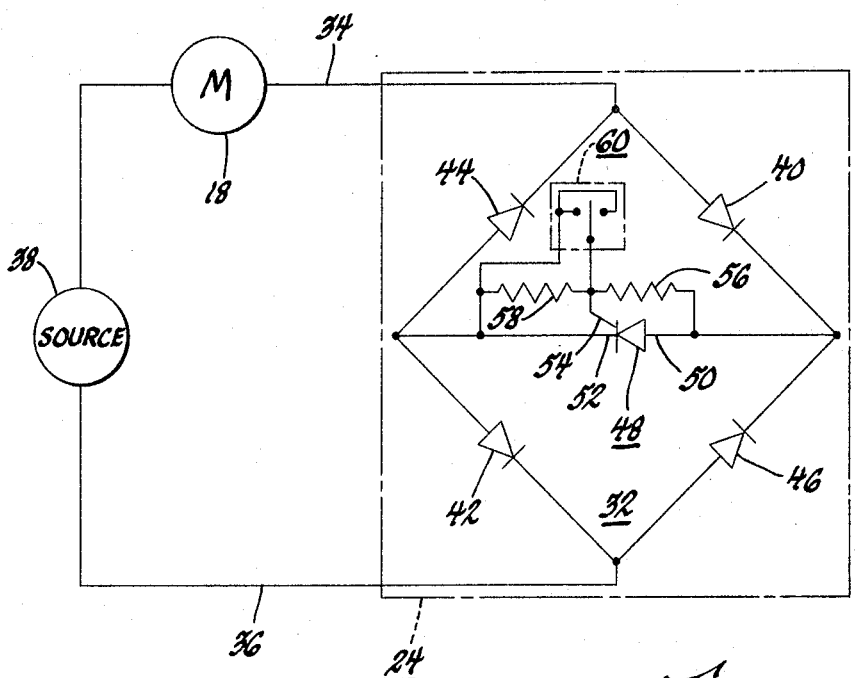
FIGURE 2 is a diagrammatic view of the control circuitry of the present invention.

In accordance with certain of the principles of the present invention, the improved means to obviate vibration problems constitutes a control assembly 24 shown in hidden lines in the control panel 22. The circuitry of the illustrated vibration control assembly 24 is shown in FIGURE 2 as comprising a full-wave rectifying bridge 32 connected across lines 34, 36 of a 115-volt power source 38 and including opposite diodes 40, 42 in two of the legs of the bridge 32 and diodes 44, 46 in the opposite legs of the bridge. The diodes act to impose a D.C. control voltage across a silicon controlled rectifier (SCR) 48 for controlling power input to a motor such as the motor 18 of the centrifugal device illustrated in FIGURE 1. In the illustrated arrangement the SCR 48 includes an input terminal 50, an output terminal 52, and a gate terminal 54. The voltage across the terminals 52, 54 is varied by a first resistance 56 connected between input terminal 50 and gate 54, a second resistance 58 connected between gate terminal 54 and output terminal 52 and a mercury switch 60 connected between resistances 56, 58 and output terminal 52. By virtue of this arrangement the mercury switch 60, upon sensing a predetermined machine vibration, will shunt the resistance 58 for conditioning the SCR 48 in a predetermined fashion so as to control power input to motor 18 from source 38 through lines 34, 36 and bridge 32. It will be appreciated that while the control circuit is illustrated as one for controlling A.C. current to drive motor means that appropriate changes could be made in the circuit so that it would be adapted for controlling D.C. motor means.

One working structural embodiment of the vibration control assembly 24 including the features of the circuit illustrated in FIGURE 2 is best discussed with reference to FIGURES 3 through 8 wherein the diodes or silicon rectifiers 40, 42, 44, 46 are illustrated as being supported on one face of a contact board 62 having one end thereof supported on and connected to a base 63 rigidly secured to cabinet 12 by screws 65. More particularly, each of the diodes of the circuit shown in FIGURE 2 are representatively formed as flat disc-like buttons in the structural arrangement with the diodes 42, 44 being supported on opposite ends of a horizontally extending bracket 64 having stepped end portions 66, 68 thereon turned inwardly toward one face of board 62 to be directed therethrough and twisted relative thereto for fixedly locating the diodes 42, 44 thereon. Likewise, the other diodes 40, 46 are supported on a like horizontally extending bracket 70 having like stepped end portions 72, 74 that also are directed through the board 62 to be twisted relative thereto for fixedly locating the diode pair 40, 46 thereon. The diodes of the rectifying bridge 32 are connected to the lines 34, 36 of the power source 38 through terminal clips 76, 78, respectively, each of which is located on the opposite side of the board 62 from the diodes and secured thereto in electrical connection therewith by suitable means, for example, the terminal ends of the diodes that are directed through openings in the board 62 and clips 76, 78 where they are cut off and soldered as best illustrated at 80 in FIGURES 3 and 5.

The SCR 48 is supported on a multiple finned heat sink unit 82 by means of a threaded terminal portion 84 thereof that is directed through the heat sink unit 82 to threadably receive a nut 86 that serves to fixedly secure the SCR 48 on unit 82. The heat sink unit 82, in turn, is secured to the control assembly base 63 by suitable means such as, for example, a nut and screw arrangement 88 that also serves to fasten the board 62 in place on base 63. The input terminal 50 of the SCR is formed as a bent lug in the structural arrangement held in place by nut 86 against unit 82. The gate terminal 54 and output terminal 52 are directed outwardly of the opposite face of the heat sink 82 as best shown in FIGURES 4 and 5.

In the illustrated structural embodiment of the invention a lead line 90 electrically connects the input terminal or lug 50 to the lower horizontally directed bracket 70 at a point representing the junction of the bridge between diodes 40, 46 as illustrated in FIGURE 2 and a lead line 92 electrically connects the output terminal 52 to the upper horizontally disposed bracket 64 at a point representing the junction of the bridge between diodes 42, 44. The connection between the leads 90, 92 and brackets 70, 64, respectively, are best illustrated in FIGURES 6 and 7.

The firing point of the silicon controlled rectifier 48 is controlled by the mercury switch 60 of the circuit in FIGURE 2, which, in the structural arrangement, is illustrated as including a mercury pool or transducer housing 94 supported on the outer face of the contact board 62. The housing 94 has a somewhat tear-shaped geometry and is secured to the board 62 by suitable means, for example, a tubular fastening element 96 directed through the housing 94 and board 62 having the ends thereof spun over into engagement with the outer face of housing 94 and the inner face of board 62 as best illustrated in FIGURE 7. A projection 98 from the inner face of housing 94 is received in an opening 100 in board 62 for preventing rotation of the housing 94 with respect to the board 62. A circular groove 102 of varying depth (see FIGURE 7) formed in the housing 94 concentrically of the element 96 directed therethrough is located with respect to the contact board so that the most shallow portion of the groove 102 is in the uppermost position and the deepest portion thereof is in the lowermost position. The variable depth groove 102, because of the interlocking relationship of tab 98 and board 62 and the fastening action of tubular element 96, is closed off by the outer surface of board 62 and the interface therebetween is sealed against fluid leakage thereacross by means of suitable adhesive sealant 105 applied at concentric surfaces 104, 106 on the inner surface of housing 94.

Within the inclined or varying depth groove 102 is trapped a predetermined amount of a suitable electrically conductive fluid material 107, for example, mercury, that is adapted to be shifted therein with respect to a plurality of circumferentially located rivets 108, 110, 112 each having one of its faces overlying the groove 102 so as to be in electrical contact with the slug of mercury therein and having the opposite end thereof located on the inner face of board 62 where each of the rivets 108, 112 is electrically connected to the horizontally directed bracket 64 by means of short lead wire portions 114, 116 best illustrated in FIGURE 5. Rivet 110 secures a U-shaped terminal clip 118 on board 62 for electrically connecting the junction between resistance 56 and resistance 58 to the rivet contact 110. In the structural embodiment a lead line 119 serves to electrically connect the gate terminal 54 to the rivet contact 110 of switch 60. The input terminal of the resistance 56 is electrically connected to the horizontally directed bracket 70 at 120 and the output terminal of resistance 58 is electrically connected at 122 to the horizontally disposed conductive bracket 64.

By virtue of the above illustrated arrangement, vibration of the control assembly base 63 by vibrations transmitted thereto through housing 12 will produce opposite shifting movement of the slug of mercury within groove 102 to cause the completion of a circuit between the contact rivet 110 and one or the other of the contact rivets 108, 112, depending upon the direction of movement of housing 94. Upon completion of a circuit between rivet 110 and one or the other of the contact rivets 108, 112, the resistance 58 will be by-passed to vary the control voltage across output terminal 52 and gate 54 of SCR 48 for varying the energization of the motor in a desired manner. In FIGURE 9 the slug of mercury 107 is shown in a stable position wherein resistance 58 reduces the control voltage at output terminal 52 of SCR 48 sufficiently to allow current flow therethrough. In FIGURES 10 and 11 the housing 94 is shifted to cause the mercury slug 107 to connect contact 110 with either contact 108 or contact 112 to thereby shunt resistance 58 to cut off SCR firing.

One feature of the invention is the provision of two pairs of contacts 108–110 and 110–112 to terminate SCR firing. Such an arrangement produces a means for continuously limiting power input to a machine drive motor as an inverse function of the amplitude of machine vibration. Accordingly, there is an almost complete power cut off upon predetermined maximum vibrations but only a gradually increasing power cutoff up to such a point. Thus, when a predetermined maximum permissible vibration is transmitted to the machine cabinet 12, the mercury pool housing 94 will vibrate to cause the slug of mercury 107 to shift in a forced and rebound direction in the variable depth groove 102 thereof to shunt the resistance 58 during substantially all of the vibration cycle. When the resistance 58 is so shunted, the differential voltage across the gate terminal 54 and output terminal 52 of SCR 48 is substantially zero and, accordingly, the SCR will not fire during a given half-wave. Thus, the power input to the motor 18 is commensurately reduced and it follows that the rotative speed of the tub is maintained without any acceleration that would cause the frame to vibrate above the predetermined maximum permissible value.

Another feature of the illustrated mercury transducer is that of its inclined or variable depth cavity or groove 102 for containing the shiftable mercury slug. By virtue of the varying depth, the greatest portion of the mass of mercury is maintained at one point in the housing, i.e., the lowermost point thereof. Hence, natural vibrations induced in the slug of mercury will be effectively damped by the relatively large mass of mercury located at this low point. However, the shifting movement of the slug of mercury caused by the substantial amplitude vibration transmitted thereto from the housing 12 will produce a magnified velocity of movement of the mercury slug as it enters the narrow portions of the groove 102 and, accordingly, will increase the overall sensitivity of the device to vibrations that are transmitted thereto.

During the vibration limiting action of the illustrated arrangement an automatic dynamic balance control system or the like may be included in the system to redistribute the weight of the rotative mass portion of the centrifugal device so that the unbalanced load induced vibrations will be reduced to thereby allow a substantially vibrationless acceleration of the tub toward a predetermined high-spin speed which will be most effective in centrifuging cleaning fluid from articles being cleaned. In such a case, the control system of the present invention will maintain machine stability during the automatic balancing process.

By virtue of the improved vibration control assembly, the need for a mechanical connection between a rotatable mass and the pickup in a vibration control system is eliminated and, furthermore, vibrations can be controlled accurately and economically by means of a very compact assembly that can be supported in the control panels of present day machines without substantial modifications thereof.

While the embodiment of the present invention as herein disclosed constitutes a preferred form, it is to be understood that other forms might be adopted.

What is claimed is as follows:

1. In an automatic washing machine the combination of, a rotatable tub, a water container enclosing said tub, means including an electrical motor for driving said rotatable tub within said water container, means including a framework for supporting said water container and rotatable tub, circuit means for electrically connecting said motor means to a source of power, said circuit means including transducer vibration sensing means fixedly secured to said framework out of operative contact with either said water container or said rotatable tub, said vibration sensing means being responsive to a predetermined range of vibrations induced in said framework for conditioning said circuit means to continuously cut back the power input to said motor means an an inverse function of the amplitude of sensed vibrations between a predetermined minimum value and a predetermined maximum value whereby tub acceleration is controlled to prevent framework vibrations in excess of said predetermined maximum value.

2. In the combination of claim 1, said vibration sensing means including a housing secured to said framework, means forming a groove in said housing, first, second, and third electrical contacts disposed within said groove having a portion thereof located exteriorly of said housing for electrical connection to said circuit means for controlling power input to said motor, each of said electrical contacts being spaced one from the other, a predetermined slug of liquid conductive material entrapped within said groove, said slug of conductive material being relatively movable with respect to said housing upon vibratory movement thereof for selectively electrically connecting first and second and second and third of said three contacts for conditioning the motor control circuit by de-energization thereof upon vibratory movement in a first predetermined direction and in a direction opposite to said first predetermined direction.

3. In the machine of claim 2, said transducer groove having a variable cross section between said electrical contacts with the greatest cross-sectional area occurring in the vicinity of said second contact.

4. In a cleaning device the combination of, a rotatable cleaning cylinder, electric motor means for driving said rotatable cylinder, line switch means for controlling power input to said motor means, and vibration responsive means for operating said line switch means in response to a predetermined range of vibrations, said vibration responsive means including means for directly and continuously conditioning said line switch means to continuously cut back power input to said motor means as an inverse function of the sensed amplitude of vibration.

5. In a cleaning device the combination of, a rotatable cylinder, electric motor means for driving said rotatable cylinder, conductor means for electrically connecting said motor means with a source of power, semiconductor switch means for controlling current through said conductor means in response to predetermined vibrations, and vibration responsive means directly electrically connected to said semiconductor switch means for conditioning said semiconductor switch means in response to sensed vibrations for continuously cutting back the power input to said motor means as an inverse function of the sensed amplitude of vibration.

6. A vibration control system for association with a centrifugal device having electrical motor drive means comprising, line switch means for controlling power input to said motor means, vibration sensing means for directly operating said line switch means in response to a predetermined vibration, said vibration sensing means including means for continuously opening and closing said line switch at a rate dependent on the sensed vibrations to limit power input to said electric motor drive means as an inverse function of the sensed amplitude of vibration.

7. In a vibration control system for association with a centrifugal device having electric motor drive means the combination comprising, line switch means for controlling power input to said motor drive means including input, output and control terminals, circuit means including vibration sensing means directly electrically connected to said line switch means for varying voltage across the output and control terminals of said line switch means for regulating power input to a centrifugal device motor drive means, said vibration sensing means including means responsive to sensed vibrations for continuously varying the voltage across said output and control terminals of said line switch at a rate dependent on said sensed vibration to continuously cut back power input to said motor means as an inverse function of the sensed ampiltude of vibration.

8. In a vibration control system for association with a centrifugal device having electric motor drive means the combination comprising, conductor means for electrically connecting said motor means with a source of power, semiconductor switch means for controlling current flow through said conductor means, circuit means including vibration sensing means directly electrically connected to said switch means for continuously conditioning said semiconductor switch means to direct power to the motor drive means in response to sensed vibrations, said conditioned semiconductor switch means continuously varying the power input to said motor drive means as an inverse function of the sensed amplitude of vibration.

9. A vibration control system for association with a centrifugal device having electric motor drive means comprising the combination of, conductor means for electrically connecting motor drive means with a source of power, semiconductor switch means having three terminals for regulating current flow through said conductor means, means including vibration sensing means directly electrically connected to said switch means for varying voltage across two of said three terminals to control power input to motor drive means, said vibration sensing means including means for continuously conditioning the voltage across said two of said three terminals to continuously control the power input to said motor means as an inverse function of the sensed amplitude of vibration.

10. In a control system for regulating vibration in a centrifugal device having an electrical motor drive means the combination of, conductor means for electrically connecting the motor drive means with a source of power, semiconductor switch means including input, output and control terminals, a source of D.C. control voltage, circuit means for connecting said source of D.C. control voltage across said input and control terminals, said circuit means including vibration sensing means for continuously varying the control voltage across said output and control terminals to continuously vary the power input to said motor drive means as an inverse function of the amplitude of sensed vibration.

11. In a control system for a centrifugal device having an electric motor drive means the combination of, conductor means for electrically connecting the motor drive means with a source of power, semiconductor switch means for controlling current in said conductor means including input, output and control terminals, circuit means including a vibration sensing means for opening and closing said semiconductor switch means, a source of control voltage, said circuit means including means for varying said control voltage, said vibration sensing means including three separate contacts, means for selectively electrically connecting first and second and second and third of said three separate contacts for selectively directing the control voltage across the output and control terminals of said semiconductor switch means for producing a continuously modulated current flow through said semiconductor switch means as an inverse function of the amplitude of vibration sensed by said vibration sensing means.

12. In a vibration control assembly for association with a centrifugal device driven by electric motor means including the combination of, support means adapted to be connected to an outer casing portion of the centrifugal device, a housing secured to said support means, means forming a groove in said housing, said support means in conjucntion with said housing serving to close said groove, first, second and third electrical contacts disposed within said groove having a portion thereof located exteriorly of said housing for electrical connection to circuit means for controlling power input to the drive motor means, each of said electrical contacts being spaced one from the other, a predetermined slug of liquid conductive material entrapped within said groove, said slug of conductive material being relatively movable with respect to said housing upon vibratory movement thereof for selectively electrically connecting first and second and second and third of said three contacts for conditioning the motor control circuit by terminating energization of a portion thereof upon vibratory movement in a first predetermined direction and in a direction opposite to said first predetermined direction for continuously modulating the power supply to said electric motor means for preventing the occurrence of a predetermined maximum vibration in the centrifugal device.

13. In the assembly of claim 12, said housing groove being generally circumferentially shaped and having a greater cross-sectional configuration adjacent one of said contacts and like lesser cross-sectional configurations in the vicinity of the second and third contacts for improving the control sensitivity.

14. In a vibration control assembly for association with a centrifugal device driven by electric motor means the combination of, a support plate, a transducer housing supported on one face of said support plate, means forming an enclosed groove between said transducer housing and said one face of said support plate, a plurality of electrical contacts on said support plate each being spaced one from the other and each having a portion thereof disposed within said enclosed groove and a portion thereof located exteriorly of said housing, terminal means on said support plate for connecting said assembly to a source of power, semiconductor switch means located adjacent the opposite face of said support plate, circuit means for electrically connecting said semiconductor switch means to said terminal means, said circuit means including means for supplying a source of direct-current control voltage to said semiconductor switch means, and means in said transducer housing groove for electrically connecting first and second of said electrical contacts upon a first predetermined vibratory movement and for connecting the second and third electrical contacts upon vibratory movement in an opposite direction for conditioning said circuit means to control current flow through said semiconductor switch means to limit power input to the electrical motor drive means as an inverse function of the sensed amplitude of vibration.

15. In the control assembly of claim 14, said enclosed groove being of a variable depth to improve transducer sensitivity.

References Cited by the Examiner

UNITED STATES PATENTS

| 2,939,064 | 5/1960 | Momberg et al. | 318—345 X |
|---|---|---|---|
| 2,963,159 | 12/1960 | Stone | 318—460 X |
| 2,967,621 | 1/1961 | Metzger | 68—24 X |
| 3,191,112 | 6/1965 | Cain | 318—245 X |

OTHER REFERENCES

"Whirlpool's Solid State Washer Control," Appliance Manufacturer, July 963, TK 7018 A6 (pp. 34–37).

ORIS L. RADER, *Primary Examiner.*

MILTON O. HIRSHFIELD, *Examiner.*

J. C. BERENZWEIG, *Assistant Examiner.*

Notice of Adverse Decision in Interference

In Interference No. 96,072 involving Patent No. 3,268,791, J. W. Burns and E. H. Halsted, CENTRIFUGAL EXTRACTION MACHINE HAVING SPEED CONTROL MEANS RESPONSIVE TO VIBRATION, final judgment adverse to the patentees was rendered Sept. 13, 1968, as to claims 1, 4, 6 and 7.

[*Official Gazette October 29, 1968.*]